United States Patent Office 2,894,935
Patented July 14, 1959

2,894,935
METHOD FOR THE PREPARATION OF POLYURETHANES

William F. Tousignant, Midland, and Huey Pledger, Jr., Freeland, Mich., assignors to The Dow Chemical Company, Midland, Mich., a corporation of Delaware No Drawing. Application March 21, 1956
Serial No. 572,813

7 Claims. (Cl. 260—77.5)

This invention relates to an improved method for the preparation of polyurethanes and has particular reference to a method for their preparation from bis (trichloroacetoxy) esters of linear diols and disecondary amines.

Polyurethanes have many practical applications among which is their ability to provide desirable fiber-forming compositions. They may be prepared according to various procedures including a well-known method which employs glycols and diisocyanates that have been obtained from diamines and phosgene, for example, as starting materials. Many of the known methods for preparing polyurethanes, however, including the identified technique, require relatively expensive starting materials. Furthermore, they may involve dangerously toxic and difficult to handle ingredients or intermediates in the synthesis. Among other considerations, such factors may have a limiting influence upon the practical significance of polyurethanes.

It is among the principal objectives of the present invention to provide an improved method for the preparation of polyurethanes.

It is also among the objectives of the invention to provide a method that could utilize relatively inexpensive and readily available starting materials.

It is among the further objectives of the invention to provide a method that would involve easily handleable materials that do not have unusually hazardous characteristics of toxicity.

It is among the additional objectives of the present invention to provide a facile method for the preparation of polyurethanes which would enable a wide variety of products to be readily obtained including polymers that may otherwise be inconvenient or impossible to prepare.

Other objectives and features of the present invention will hereinafter appear.

According to the invention, polyurethanes may be prepared by reacting a bis (trichloroacetoxy) alkane ester of a linear diol and a disecondary amine. Advantageously, the reactant materials are employed in a substantially pure form for the reaction. Thus, for example, a rectified or distilled ester may be utilized with especial benefit as may anhydrous forms of the amines. It is especially important to avoid using esters which may be contaminated with water or unreacted acid materials. While any ratio of reactants may be used, it is generally desirable to practice the method with about equimolar proportions. Polyurethane products may be prepared in accordance with the invention with high yields from the conversion of the reactant materials. Yields which are in the neighborhood of 50 to 80 percent and higher may ordinarily be experienced with the present method.

The esters that may be employed are those which may be prepared with trichloroacetic acid and various linear diols and the like. They may be represented by the general formula:

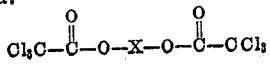

wherein X is a bivalent radical of a diol and, advantageously, may be a bivalent radical from ethylene glycol or butylene glycol. In many instances, it may be desirable to employ mixtures of diverse esters. Such radicals as

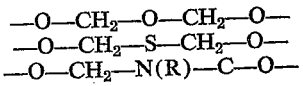

(wherein R may be an alkyl or an aryl group, for example);

and the like illustrate general type arrangements which may be utilized with particular advantage. As is apparent, the radical employed for X may have various substituent groups in attachment thereto and may frequently consist of those having inner oxygen, sulfur and nitrogen linkages.

The disecondary diamines may be selected from the group consisting of heterocyclic diamines, N,N'-bis substituted diamines of the general type HNZ—R—ZNH, wherein Z may be an alkyl group having from 1 to 4 carbon atoms and R may be an alkyl, aryl or aralkyl radical, and mixtures thereof. Piperazine, substituted piperazines (including 2,5-dimethyl piperazine, 2,6-dimethyl piperazine and 2,5-diethyl piperazine and the like) and such diamines as N,N'-dimethylhexamethylene diamine may be utilized with particular benefit in the practice of the invention.

The reaction which is involved in accomplishing the method of the invention may be represented by the following, wherein the disecondary diamine is symbolically represented by HN—Am—NH and equimolar proportions of the reactants are employed:

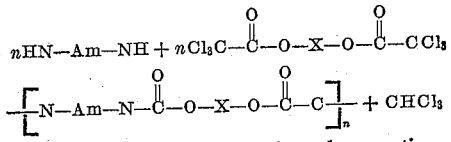

Ordinarily, it is desirable to conduct the reaction so that the recurring unit is repeated at least about ten times in the linear chain which is formed, as may be expressed by assigning a numerical value for n of at least about 10. Frequently it is more advantageous for the reaction to be performed so that "n" has a considerably higher numerical value.

As is illustrated, chloroform is evolved during the condensation which occurs. For this reason it is usually advantageous to conduct the reaction under a suitable vacuum such as may be obtained by employment of a water aspirator, barometric leg or a steam jet. The reaction may usually be accomplished by directly mixing the ingredients with efficient agitation although, in certain instances, suitable inert solvents or other dispersant vehicles may be employed.

Ordinarily the reaction may be conveniently accomplished under atmospheric pressure although, as mentioned, subatmospheric pressures may advantageously be utilized to facilitate removal of the chloroform. Most reactant materials may be converted to polyurethanes at temperatures between about 25 and 150° C. In many instances, it is more advantageous to employ a temperature between about 25 and 100° C. for the reaction, although with certain types of diamines, such as substituted piperazines, the employment of higher temperatures within the broader range may accomplish better results. The reaction may usually be accomplished within periods of time of less than about 20 hours and frequently in a substantially shorter time.

The polyurethane products may be recovered from the reaction mass according to various techniques that are adapted to the specific conditions involved and which are apparent to those skilled in the art. For example, filtration, washing and drying procedures are ordinarily suitable, although, if solvents are employed as vehicles in the reaction, evaporation and precipitation methods may also be involved in their recovery.

In order to further illustrate the invention, but without being restricted thereto, the following examples are given.

*Example I*

About 17.2 grams (0.2 mole) of anhydrous piperazine and 76.2 grams (0.2 mole) of distilled 1,4-bis (trichloroacetoxy) butane were mixed together and stirred in a conventional 3-neck flask which was connected to a water aspirator in order to effect a vacuum. The temperature in the reaction mass initially rose to about 65° C. shortly after the reactant materials were combined and, simultaneously, the mixture became homogeneous with a steady evolution of chloroform. The reaction mass was permitted to remain under the vacuum for a period of about 16 hours. A waxy solid was thereby obtained which was slurried with about 500 milliliters of acetone and filtered therefrom. The filter cake was reslurried in water, refiltered and washed thoroughly with acetone before being dried in vacuo. The vacuum dried polyurethane powder was obtained in the amount of about 26.8 grams, which indicated that about a 56.7 percent yield was obtained from the reactant materials. The product softened at about 153° C. It had a melting point of about 163.5° C. Its structure could be represented by the following:

$$\left[-N\underset{CH_2-CH_2}{\overset{CH_2-CH_2}{\diagup\diagdown}}N-\overset{O}{\overset{\|}{C}}-O-(CH_2)_4-O-\overset{O}{\overset{\|}{C}}-\right]_n$$

Under infra-red analysis, it showed the absorption bands at 5.9, 8.0 and 9.0 millimicron wave lengths which are typical for compounds having a urethane linkage.

*Example II*

A solution of about 14.1 grams (0.04 mole) of solid, distilled 1,2-bis (trichloroacetoxy) ethane in about 61 grams (0.16 mole) of 1,4-bis (trichloroacetoxy) butane ($n_D^{20}$ 1.4912) was prepared by warming the ingredients to a temperature of about 50° C. To the solution, about 17.2 grams (0.2 mole) of pure anhydrous piperazine was added. The temperature initially rose slowly to about 72° C. The chloroform was removed under vacuum from a water aspirator while the temperature, which had dropped from its initial level, was maintained at about 52° C. for a period of about 2½ hours. The reaction mass was then permitted to stand under the vacuum for an additional 16 hour period. A light yellow waxy solid was obtained from which the polyurethane product was recovered in a manner similar to that set forth in the first example. The final product, after additional washing in ethyl ether, had a melting point in the neighborhood of 140.5–142.0° C. It softened at about 136.5° C. When molten, the ester polyurethane product could be drawn into a fiber.

*Example III*

A polyurethane product having the general formula:

$$\left[-N\underset{CH_2-CH_2}{\overset{CH_2-CH_2}{\diagup\diagdown}}N-\overset{O}{\overset{\|}{C}}-O-(CH_2)_2-O-\overset{O}{\overset{\|}{C}}-\right]_n$$

was prepared in a manner analogous to that set forth in the first two examples by reacting anhydrous piperazine with substantially pure 1,2-bis (trichloroacetoxy) ethane. The polyurethane product had fiber-forming properties and melted between about 171 and 178° C.

Analogous polyurethane products may be obtained in yields as high as 80 per cent when 2,5-dimethyl piperazine or 2,6-dimethyl piperazine is condensed at a temperature in excess of 100° C. in a manner similar to the foregoing with 1,4-bis (trichloroacetoxy) butane and 1,2-bis (trichloroacetoxy) ethane.

What is claimed is:

1. Method for the preparation of polyurethanes which comprises mixing a bis (trichloroacetoxy) ester of a linear diol having the general formula:

$$Cl_3C-\overset{O}{\overset{\|}{C}}-O-X-O-\overset{O}{\overset{\|}{C}}-CCl_3$$

wherein the unit —O—X—O— is a bivalent organic radical obtained by removing the terminal hydrogen atoms from a diol, with a disecondary diamine selected from the group consisting of heterocyclic diamines, N,N'-bis substituted diamines of the formula:

$$HNZ-R-ZNH$$

wherein Z is an alkyl group having from 1 to 4 carbon atoms and R is selected from the group consisting of alkylene, arylene and aralkylene radicals and mixtures thereof; and subjecting the mixture of the ester and the diamine with formation of chloroform to heat a temperature between about 25 and 150° C. until substantial portions of the reactant materials are condensed and converted to a polyurethane.

2. The method of claim 1 and including the step of conducting the condensation reaction under a vacuum.

3. The method of claim 1 wherein the ester is 1,4-bis (trichloroacetoxy) butane.

4. The method of claim 1 wherein the ester is 1,2-bis (trichloroacetoxy) ethane.

5. The method of claim 1 wherein the diamine is piperazine.

6. The method of claim 1 wherein the ester and the diamine are employed in a substantially pure form.

7. The method of claim 1, wherein the mixture of said ester and said diamine is subjected to heat at a temperature between about 25 and 100° C.

References Cited in the file of this patent

UNITED STATES PATENTS 2,731,446    Wittbecker _____ Jan. 17, 1956

FOREIGN PATENTS 615,884    Great Britain _____ Jan. 13, 1949

OTHER REFERENCES

Whitmore: "Organic Chemistry," page 331, Van Nostrand, 1937.